May 5, 1953
J. H. POWERS
2,637,605
PERMANENT LUBRICATION SYSTEM FOR
VERTICALLY MOUNTED BEARINGS
Filed July 26, 1951
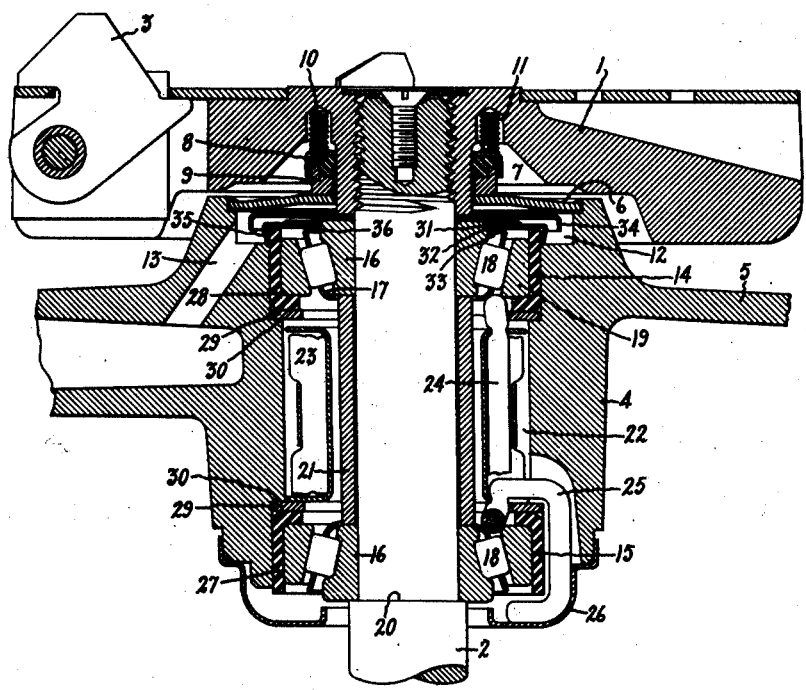
Inventor:
James H. Powers,
by /s/ Sheridan W. Byys
His Attorney.

Patented May 5, 1953

2,637,605

UNITED STATES PATENT OFFICE 2,637,605

PERMANENT LUBRICATION SYSTEM FOR VERTICALLY MOUNTED BEARINGS

James H. Powers, Westport, Conn., assignor to General Electric Company, a corporation of New York Application July 26, 1951, Serial No. 238,706

4 Claims. (Cl. 308—187.1)

My invention relates to a system or arrangement for permanently lubricating bearings which are mounted for rotation on a vertical axis. More particularly, my invention relates to a seal for preventing the escape of oil from such bearings and for preventing the entrance of moisture to the bearing. Although designed specifically for use with the motor driven flywheel of a food waste disposer, my invention obviously has other uses. The present invention may be considered an improvement upon constructions disclosed in my prior patents 2,282,883 and 2,284,446 and my patent application, Serial No. 84,954, filed April 1, 1949. These prior patents and patent application are all assigned to the same assignee as the present invention.

Although the prior constructions mentioned above are practical under most situations, it has been found that under heavy service and continued operation for long intervals, there may be a tendency for the oil to build up and flood over the outer bearing edge and be discharged from the bearing lubrication system. Furthermore, in these former designs, if water should leak past the seal provided for it, there might be a tendency for such water to find its way to the bearing. The present invention is concerned with structures to prevent the flooding of oil outside of the lubrication system, and structures to prevent water from entering the bearing.

Other objects and the details of that which I believe to be novel and my invention will be clear from the following description and claims taken with the accompanying drawing in which is illustrated an example of vertical bearing embodying the present invention and incorporating my improved oil and water seals. In the drawing, the single figure is a vertical sectional view through the flywheel and supporting structure of a waste food disposer to which my invention has been applied.

In a waste food disposer of the type for which my invention is particularly adapted, there is a flywheel 1 suitably fixed to and driven by a rotating shaft 2 which is driven by a motor, not shown. Waste and water are introduced into the machine above the face of the flywheel and are impelled in a rotary direction and shredded by impellers 3 and shredding mechanism surrounding the periphery of the flywheel. The shredding mechanisms are not part of the present invention and need not be further described here. However, it should be noted that water is introduced above the flywheel so that a seal must be provided to prevent entry of the water into the bearings below.

The flywheel shaft, the bearings, and the various seals are all supported by a supporting structure such as the stationary bottom casting 4. In a waste food disposer, this bottom casting also contains drain passages for the waste and water when they leave the flywheel. The normal waste and water passages are indicated by the upper surface 5 on the bottom casting. A suitable water seal is provided between the bottom casting and the flywheel by means of a diaphragm 6 fixed to the bottom casting and surrounding the hub 7 on the flywheel. Annular sealing and bearing members 8 and 9 respectively are carried around the outside of the hub and seal against the hub and bear against the diaphragm, being spring-pressed into sealing and bearing engagement by a series of springs 10 seated in recesses 11 in the underside of the flywheel surrounding the hub.

Under exceptional circumstances, there might be some leakage of water past this seal and I have provided an annular trough 12 in the top face of the bottom casting to collect such water, and a drain 13 to carry water from this trough to the outside of the machine.

In order to support the flywheel and prevent movement of the flywheel shaft in either vertical direction, I have provided an upper bearing 14 and a lower bearing 15, each of which is composed of the same elements which therefore will be described by the same numbers. Each bearing has an inner race or cone 16 around which is arranged a cage 17 carrying rollers 18. An outer race or cup 19 completes each bearing. It will be noted that the bearing 14 is tapered downwardly and supports the shaft and flywheel structure against downward vertical movement while the bearing 15 is tapered upwardly and restrains the shaft against upward vertical movement. It will be understood that the inner races or cones have a press fit with the shaft. The lower bearing also rests against a shoulder 20 on the shaft and is held in spaced relation from the upper bearing by a cylindrical collar 21 which bears against the underside of the upper bearing cone. Between this upper cone and the bottom of the hub on the flywheel certain deflectors or closures are clamped, which will be described later.

Both bearings are permanently lubricated by oil which is suitably introduced into an oil reservoir 22 which surrounds the shaft between the spaced bearings. This reservoir contains a spool of sheet felt or other suitable material 23 which surrounds the shaft between the bearings and is saturated with oil. A wick 24, which may also be of felt, passes through the oil saturated spool 23 and extends upwardly to a position where it touches the cage 17 of the top bearing as shown. A similar wick 25 extends into contact with the cage of the bottom bearing, but this wick also passes down around the outside of the bottom bearing to lay in the bottom of a closure cap 26 which is suitably secured to the bottom casting. Excess of oil in the bottom closure or cap 26 is picked up by the wick 25 and returned to the saturated spool reservoir 23. Obviously, also, the wicks 24 and 25 feed oil from the reservoir to the cages on each bearing. As the shaft is rotated, the oil in the form of a surface film is carried upwardly in bearing 14 and downwardly in bearing 15 but outwardly through both the bearings because of centrifugal action.

Both bearings are resiliently supported and sealed within the bottom casting or supporting structure by means of resilient supporting collars 27 for the lower bearing and 28 for the upper bearing. The outer race member or cup for each bearing fits snugly within each collar and the collar in turn has a press fit within the bore of the bottom casting. The inner end of each resilient collar adjacent the oil reservoir is formed inwardly over the edge of the bearing as shown and is supported against a washer 29 seated on a shoulder 30 in the bore of the bottom casting. The collars are made of "Buna" rubber, "Neoprene" or other suitable resilient rubber-like material which is impervious to oil.

With the construction just described, there is no particular problem in retaining oil passing through the bottom bearing and returning it to the oil reservoir without loss. However, there is a problem in retaining oil which has passed through the top bearing. This problem is complicated by the problem of protection from water which might leak past the rotary seal at the top. In my former designs, especially if the oil were light in weight or if the machine were operated for long periods of time without stopping, oil passing through the top bearing by centrifugal action would build up at the top and overflow through the drain trough 12 and through the drain 13 to the outside of the machine. In order to prevent this, my former designs provided a shield or closure 31 in the form of a disk surrounding the shaft and clamped between the cone 16 of the upper bearing and the hub 7 of the flywheel. It will be understood by reference to my former patents and application that the shape of this member has been changed in the present structure. This closure now has a downwardly stepped portion or skirt 32 at the end of which is an annular ledge 33 which extends outwardly as will be later described.

Used with this shield is another shield or closure 34, also clamped between the upper bearing cone and the hub, this second shield 34 extending outwardly well beyond the confines of the bearing and having a downwardly turned edge directed toward the drainage trough 12.

It will be noted that the resilient supporting collar 28 extends upwardly into the trough 12 and above the bearing 14. Where heavy service is encountered, this extension of the collar and the shields 31 and 34 may not be sufficient to prevent oil from flooding over the outer bearing edge where it may escape down the water drain 13. By taking advantage of the rotating characteristics of the various components of the tapered bearing, my present invention will prevent a build-up and overflow of oil even when the oil is of a light grade or when the machine is operated continuously for extended periods of time. This is done through the medium of a stationary shield 35, which, together with the shields 31 and 34 above described, prevents oil from being pumped out of the bearing lubrication system, and prevents water from entering the bearing lubrication system. This shield 35 is of metal, in the form of an annulus with a downwardly turned or flanged edge which is pressed over the outside of, and retained by, the stationary resilient member 28. Like this resilient retainer for the cup portion of the bearing, the shield 35 is stationary. It has an inner circular opening 36 which loosely surrounds the stepped portion 32 of the shield 31. The outer bottom flange 33 on the shield 31 extends below the shield 35 and has an outer diameter equal to or preferably greater than the diameter of the hole 36.

In operation of the machine, as the shaft rotates, the inner races or cones of the bearing will rotate at the same speed as the shaft. For example, in the waste disposer for which the present invention was expressly designed, the shaft and the inner bearing races rotate at approximately 1,725 R. P. M. Obviously the rollers and the cages in the bearings rotate at a relatively slower speed, say 500 R. P. M. The shields 31 and 34, being clamped against the flywheel hub and the cone at the top, also rotate at the shaft speed. However, the shield 35, being held by the stationary supporting structure, does not rotate at all. When the shaft is rotated, an oil film is carried up through the cage 17 and builds up and floods under the stationary shield or closure 35. Oil from the high speed race or cone 16 and from the shield or closure 31 is slung outwardly, also under the closure 35. This results in a pressure build-up of oil under the shield 35, and the pressure will drive oil down through the roller and cage of the bearing along the outer race or cup 19 because the cage and rollers rotate at a relatively slow speed. Below the bearing, oil is returned to the reservoir by gravity where it can again enter circulation. The bearing retainer or support 28 acts as a mounting and sealing structure for the outer edges of shield 35.

With this positive means of preventing oil escape, I am enabled to use a larger size felt wick and lighter oil than formerly. This permits rapid conduction of oil to the bearings and back to the reservoir with a fresh film of oil going through the bearing structure in about 30 seconds of operation. This compares with about 3 minutes time for circulation with former designs.

It will also be noted that there is a close clearance between shield 34 and the top of stationary shield 35. With this arrangement, the shield 34 acts as a centrifugal pump and any water leaking past the water seal is pumped into the trough 12 around the outside of the bearing assembly and out of the drain 13.

As will be evident from the foregoing description, certain aspects of my invention are not limited to the particular details of construction of the example illustrated, and I contemplate that various and other modifications and applications of the invention will occur to those skilled in the art. It is, therefore, my intention that the appended claims shall cover such modifications and applications as do not depart from the true spirit and scope of my invention.

What I claim as new and desire to secure by Letters Patent of the United States is:

1. In a lubricant distributing structure for use with a relatively stationary frame having a vertical bore with an open top therein, a bearing having an inner inverted tapered cone, intermediate rolling bearing members, a cage for said rolling bearing members, and an outer tapered cup supporting said cone, cage, and bearing members, said outer bearing cup being seated in the open top of said bore, an annular resilient bearing support and seal located between said bearing and said bore with a top edge on said seal extending upwardly above said bearing and the open top of said bore, a vertical shaft journaled in said bearing, means supplying liquid lubricant to the bottom of said bearing at said cage, and a rotating liquid shielding annular member fixed to said shaft above said bearing and extending freely radially outwardly beyond said bearing and said resilient bearing support, that improvement comprising a stationary liquid shielding annular member liquid sealed to the top edge of said resilient bearing support, a downwardly turned flange on said stationary member surrounding the top of said resilient support, said stationary annular member having a central opening of given diameter therein freely surrounding said shaft and located above the upper stationary outer cup of said bearing and the inner slower moving cage and rolling bearing members of said bearing, a second rotating liquid shielding annular member fixed to the shaft above the bearing and below said first rotating annular member, said second annular member having a downwardly stepped portion extending from above to underneath said stationary annular member and an outwardly directed flange edge extending radially underneath said stationary annular member and having an outer diameter larger than the diameter of said central opening in said stationary member, and said stationary liquid shield being located close enough to said first rotating liquid shield so that centrifugal pumping action is produced therebetween.

2. A bearing and oil seal for a vertical shaft rotating with respect to a fixed frame comprising an upwardly facing bearing bore within said frame concentric with respect to said shaft, a resilient liner within said bore and having an upper annular edge projecting above said bore, an upwardly and outwardly tapered anti-friction bearing having an outer race snugly received within said liner and an inner race secured to said shaft with caged rolling members between said races, means supplying liquid lubricant to bottom portions of said bearing, a downwardly facing cup-shaped disk with a radially outwardly flared flange fixed to said shaft immediately overlying said inner race and of a diameter not exceeding the maximum diameter of the cage for said rolling members, and an annular fixed shield having an outer flanged portion in sealing relation with said resilient liner and a central opening freely surrounding said shaft and overlying said disk, the diameter of said central opening being no greater than the diameter of said disk.

3. A bearing and oil seal for a vertical shaft rotating with respect to a fixed frame comprising an upwardly facing bearing bore within said frame concentric with respect to said shaft, a resilient liner within said bore and having an outer annular edge projecting above said bore, an upwardly and outwardly tapered anti-friction bearing having an outer race snugly received within said liner and an inner race secured to said shaft with caged rolling members between said races, means supplying liquid lubricant to bottom portions of said bearing, a disk immediately overlying said inner race fixed to said shaft and extending outwardly to a diameter not exceeding the maximum diameter of the cage for said rolling members, said disk having a downwardly extending annular wall intermediate its inside and outside diameters thereby defining an inverted cup shape with a radially outwardly extending lower flange, and an annular fixed shield having an outer flanged portion in sealing relation with said resilient liner and a central opening closely surrounding said downwardly extending annular wall of said disk, said shield and said disk being out of direct contact.

4. A bearing, lubrication, and sealing structure for a shaft having a driven member on the outside end thereof comprising a supporting frame having a shaft bore rotatably receiving said shaft and an enlarged bearing bore on the outer face thereof adjacent the driven member, a resilient annular liner in said bearing bore, a tapered roller bearing having an outer race supported by said liner and an inner race secured to said shaft with cage retained rollers between said races, said cage tapering outwardly toward the driven member, means supplying liquid lubricant to the inside of said bearing whereby it is thrown toward the outside by centrifugal force over the moving surfaces of said bearing, a sealing diaphragm on said frame extending over the outer face thereof and apertured for said shaft sealing means rotatable with said shaft and cooperable with said diaphragm thereby to seal said face against entrance of foreign material, a first cup-shaped disk rotatable with said shaft within an enlarged portion of said bore enclosed by said diaphragm and sealing means, a stationary annular shield within the area covered by said disk and having an outer flanged edge in sealing relation with said resilient liner and a central opening of given diameter freely surrounding said shaft, and a second cup-shaped disk with an outwardly flared peripheral edge of diameter exceeding said given diameter in said shield, said second disk rotating with said shaft and immediately overlying the inner race of said bearing with the outer edge thereof within the bearing bore and covered by the inner portion of said shield, said shield and said second disk providing an oil seal for lubricant thrown outwardly by said bearing.

JAMES H. POWERS.

References Cited in the file of this patent
UNITED STATES PATENTS

| Number | Name | Date |
| --- | --- | --- |
| 1,105,268 | Gohlke | July 28, 1914 |
| 2,004,440 | Kazenmaier et al. | June 11, 1935 |
| 2,282,883 | Powers | May 12, 1942 |